United States Patent
Lv et al.

(10) Patent No.: US 11,722,550 B2
(45) Date of Patent: Aug. 8, 2023

(54) SHARING AN INPUT DEVICE BETWEEN REMOTE DESKTOPS OF MULTIPLE CLIENT DEVICES

(71) Applicant: VMware, Inc., Palo Alto, CA (US)

(72) Inventors: Lin Lv, Beijing (CN); Yunfei San, Beijing (CN); Yunxia Cheng, Beijing (CN); Jack Liu, Beijing (CN); Ning Ke, Northborough, MA (US); Yang Liu, Beijing (CN); Jian Ken Song, Beijing (CN)

(73) Assignee: VMware, Inc., Palo Alto, CA (US)

( * ) Notice: Subject to any disclaimer, the term of this patent is extended or adjusted under 35 U.S.C. 154(b) by 268 days.

(21) Appl. No.: 16/535,685

(22) Filed: Aug. 8, 2019

(65) Prior Publication Data

US 2021/0006615 A1 Jan. 7, 2021

(30) Foreign Application Priority Data

Jul. 3, 2019 (WO) ................ PCT/CN2019/094597

(51) Int. Cl.
*H04L 29/08* (2006.01)
*G06F 9/451* (2018.01)
(Continued)

(52) U.S. Cl.
CPC ............ *H04L 67/025* (2013.01); *G06F 9/452* (2018.02); *G06F 9/45533* (2013.01)

(58) Field of Classification Search
CPC ... H04L 67/025; G06F 9/452; G06F 9/45533; G06F 3/1423; G09G 5/38
See application file for complete search history.

(56) References Cited

U.S. PATENT DOCUMENTS

| 2012/0011445 A1* | 1/2012 | Gilboa | .................. G06F 3/0481 |
| | | | 715/740 |
| 2013/0113703 A1* | 5/2013 | Zheng | ..................... G06F 3/038 |
| | | | 345/157 |

(Continued)

OTHER PUBLICATIONS

Phillips, Gavin: "Why You No Longer Need a KVM Switch for Multi-PC Setups," MakeUseOf, Mar. 14, 2019, 8 pages. Retrieved May 8, 2019 from URL: http://https://www.makeuseof.com/tag/why-you-no-longer-need-a-kvm-switch-for-your-multi-pc-setup/.

(Continued)

*Primary Examiner* — Matthew Ell
*Assistant Examiner* — Kenny Nguyen
(74) *Attorney, Agent, or Firm* — Kim & Stewart LLP

(57) ABSTRACT

An input device is shared between a first remote desktop having a first display image, which is displayed on a first display of a first client device, and a second remote desktop having a second display image, which is displayed on a second display of a second client device. Upon detecting that an input pointer of the input device currently displayed within the first display image on the first display, is moved across an edge of the first remote desktop that corresponds to a virtual boundary between the first remote desktop and the second remote desktop, instructions are issued to a first remote computing device that is hosting the first remote desktop to discontinue receiving inputs made with the input device and a second remote computing device that is hosting the second remote desktop to begin receiving inputs made with the input device.

17 Claims, 6 Drawing Sheets

(51) Int. Cl.
    *G06F 9/455*     (2018.01)
    *H04L 67/025*     (2022.01)

(56) References Cited

U.S. PATENT DOCUMENTS

| | | | | |
|---|---|---|---|---|
| 2013/0283193 | A1* | 10/2013 | Griffin | G06F 3/1446 |
| | | | | 715/761 |
| 2015/0301874 | A1* | 10/2015 | Mooring | G06F 21/606 |
| | | | | 713/2 |
| 2017/0351629 | A1* | 12/2017 | Passeri | G06F 13/4022 |
| 2018/0113663 | A1* | 4/2018 | Jain | G09G 5/14 |
| 2018/0129510 | A1* | 5/2018 | Zhang | G06F 9/452 |
| 2019/0026058 | A1* | 1/2019 | Chen | A61B 5/02141 |

OTHER PUBLICATIONS

Popov, Dmitri: "Share Mouse and Keyboard with QuickSynergy," Linux Magazine, Mar. 16, 2009, 2 pages. Retrieved May 8, 2019 from URL: http://www.linux-magazine.com/Online/Blogs/Productivity-Sauce/Share-Mouse-and-Keyboard-with-QuickSynergy.
Sharemouse: "ShareMouse v4—Manual," 2002-2019 Bartels Media GmbH, 13 pages. Retrieved May 8, 2019 from URL: http://www.keyboard-and-mouse-sharing.com/docs4/09/manual.php.
Wikipedia: "Synergy (software)," Last Edited Apr. 16, 2019, 3 pages. Retrieved May 8, 2019 from URL: https://en.wikipedia.org/wiki/Synergy_(software).

\* cited by examiner

US 11,722,550 B2

SHARING AN INPUT DEVICE BETWEEN REMOTE DESKTOPS OF MULTIPLE CLIENT DEVICES

CROSS-REFERENCE

This application is based upon and claims the benefit of priority from International Patent Application No. PCT/CN2019/094597, filed on Jul. 3, 2019, the entire contents of which are incorporated herein by reference.

BACKGROUND

In a computing environment that provides remote desktops, a user may launch more than one remote desktop and use them concurrently. For example, the user may be concurrently using a remote desktop that is running Windows® 7 and another one that is running Windows® 10. When the number of concurrently running remote desktops on different physical devices increase, the number of required sets of input devices also increases. The increase in the number of input devices leads to user confusion and often causes mistakes in inputs.

A traditional way is to reduce the number of input devices is to leverage a hardware KVM (keyboard-video-mouse) switch to manually or automatically switch the pairing of a single set of input devices to different remote desktop clients. Another conventional solution is to install a software KVM switch in each of the remote desktop clients to allow the user to pair a single set of input devices with different remote desktop clients.

SUMMARY

One or more embodiments enable an input device to be shared, without a software or a hardware KVM switch, between two remote desktops. According to one embodiment, the method of processing inputs made with the shared input device between a first remote desktop having a first display image, which is displayed on a first display of a first client device, and a second remote desktop having a second display image, which is displayed on a second display of a second client device, includes the steps of detecting an attempt to move an input pointer of the input device currently displayed within the first display image on the first display, across an edge of the first remote desktop using the input device, determining whether or not the edge of the first remote desktop corresponds to a virtual boundary between the first remote desktop and the second remote desktop, and upon determining that the edge of the first remote desktop corresponds to the virtual boundary between the first remote desktop and the second remote desktop, instructing a first remote computing device that is hosting the first remote desktop to discontinue receiving inputs made with the input device and a second remote computing device that is hosting the second remote desktop to begin receiving inputs made with the input device.

Further embodiments of the present invention include a non-transitory computer readable storage medium that includes instructions that enable a processing unit to implement one or more aspects of the above method, as well as a remote desktop system configured to implement one or more aspects of the above method.

DETAILED DESCRIPTION

Figure 1:
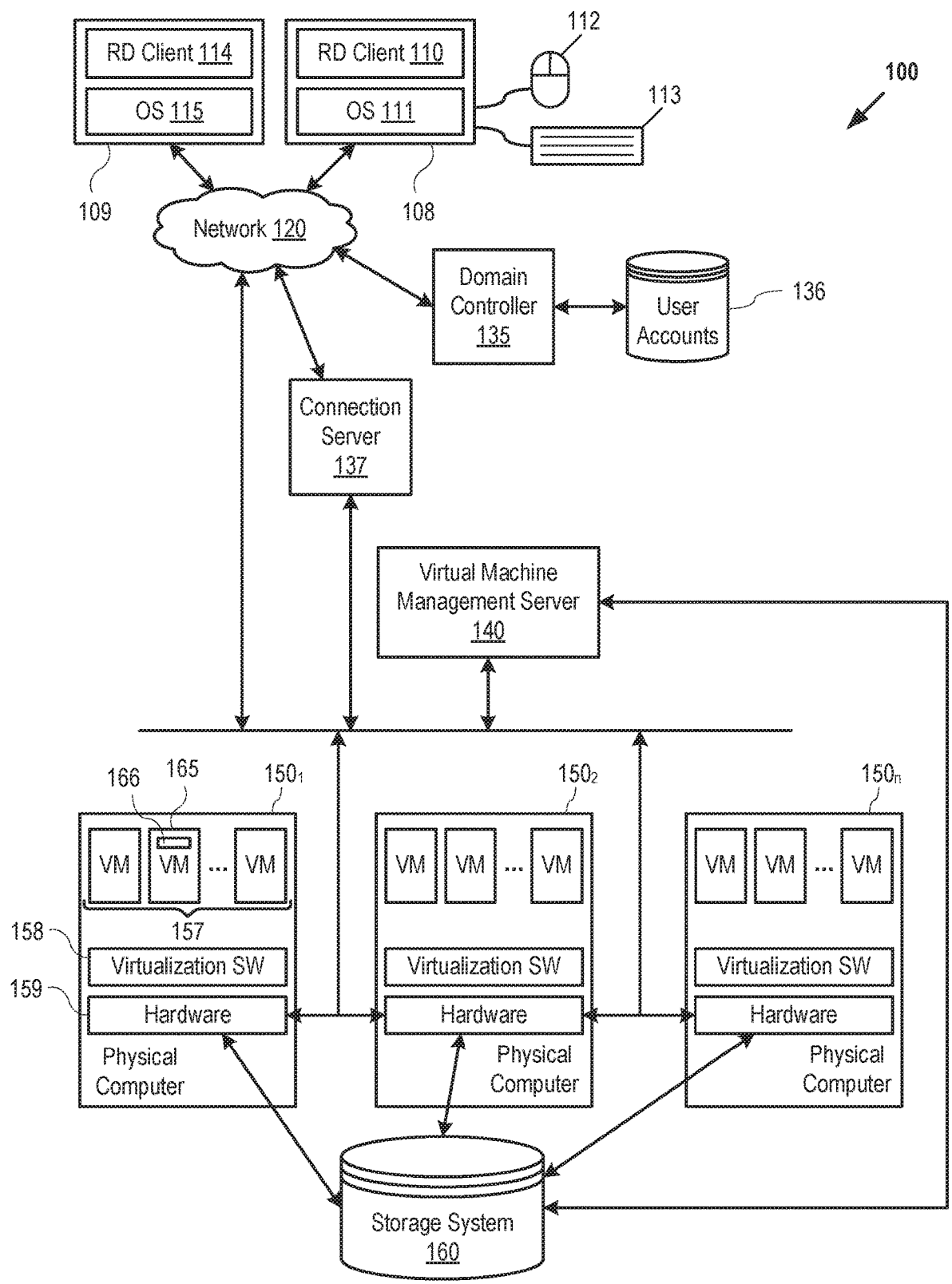
FIG. 1 illustrates components of a virtualized desktop infrastructure system in which a single set of input devices is shared between remote desktops according to one or more embodiments.

FIG. 1 illustrates components of a virtualized desktop infrastructure (VDI) system 100 (also referred to as a remote desktop computer system) in which a single set of input devices is shared between remote desktops according to one or more embodiments. In VDI system 100, remote desktop client software programs (also referred to as "RD clients" for short) run on operating systems of local computing devices. In the embodiment illustrated in FIG. 1, RD client 110 runs on top of operating system (OS) 111 of client device 108, and RD client 114 runs on top of OS 115 of client device 109. In addition, client device 108 has attached thereto a set of input devices including a mouse 112 and a keyboard 113, and client device 109 employs a touchscreen as an input device.

RD clients provide an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With RD clients, users can access desktops running in a remote data center through network 120, from any location, using a general purpose computer running a commodity operating system and a RD client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection server 137 that manages connections between RD clients and desktops running in virtual machines 157 or other platforms. Domain controller 135 and connection server 137 may run on separate servers or in separate virtual machines running on the same server or different servers. In the embodiments of the present invention illustrated herein, desktops are running in virtual machines 157 and virtual machines 157 are instantiated on a plurality of physical computers 1501, 1502, . . . , 150n, each of which includes virtualization software 158 and hardware 159, is controlled by a virtual machine management server 140, and is coupled to a shared persistent storage system 160.

A particular configuration of the virtualized desktop infrastructure is described above and illustrated in FIG. 1, but it should be recognized that one or more embodiments may be practiced with other configurations of the virtualized desktop infrastructure.

Figure 2A:
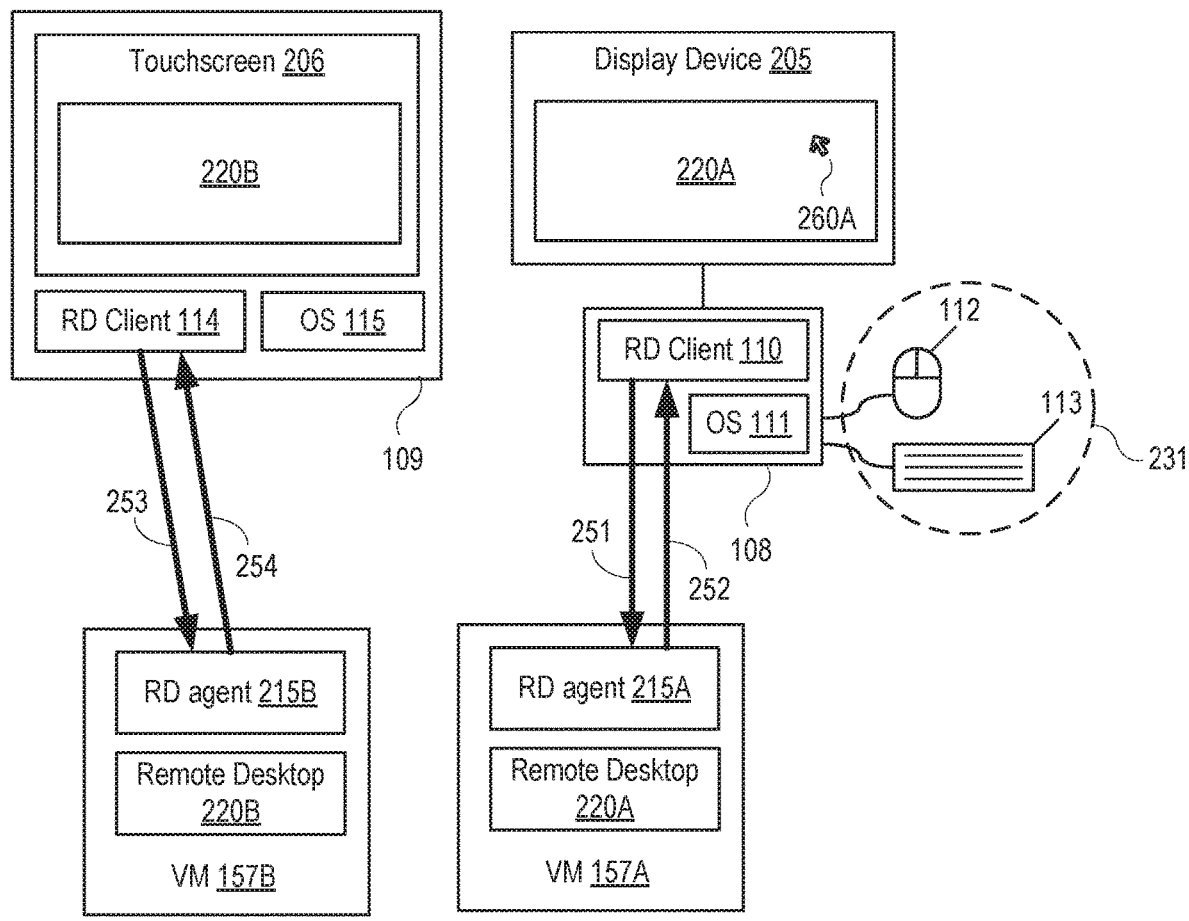
FIGS. 2A-2C are conceptual diagrams that illustrate communication paths between clients and agents of different remote desktops.
Figure 2B:
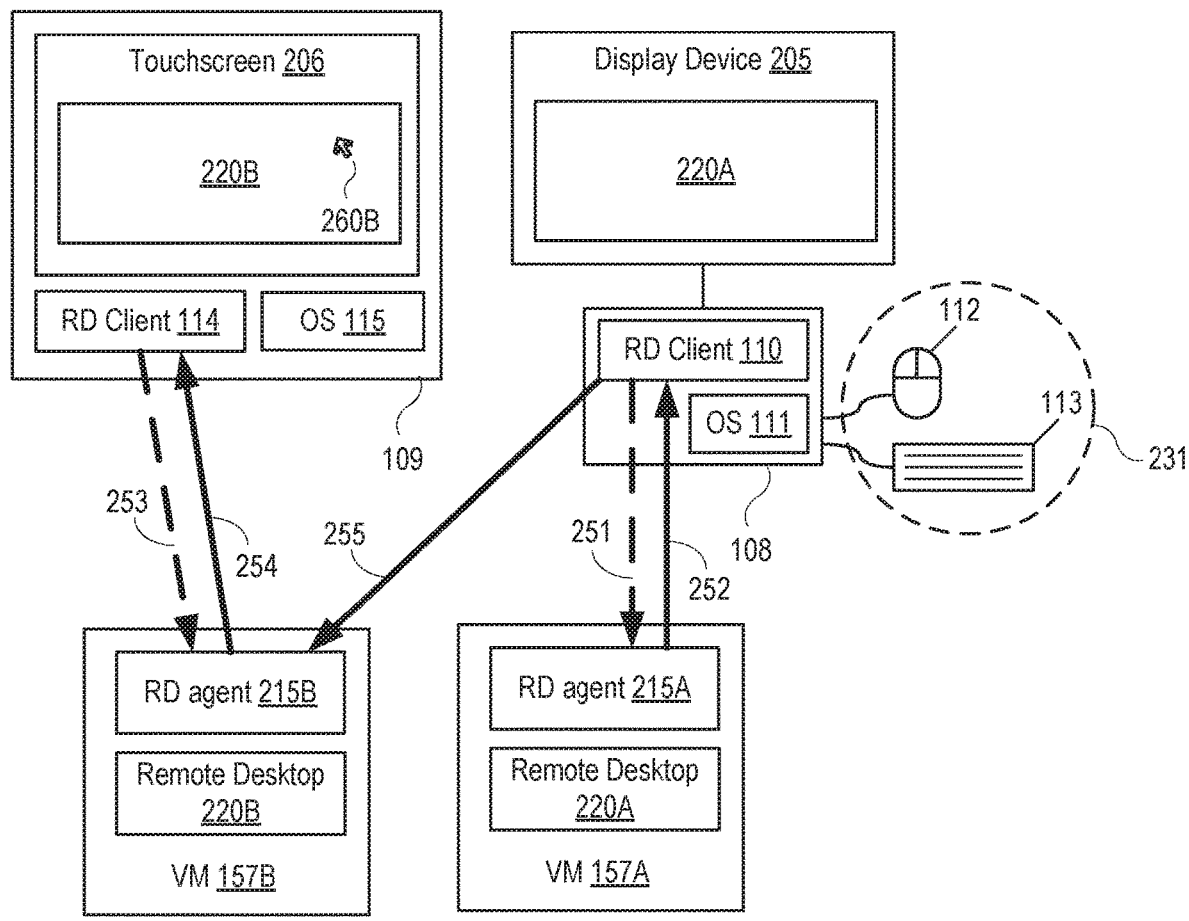
Figure 2C:
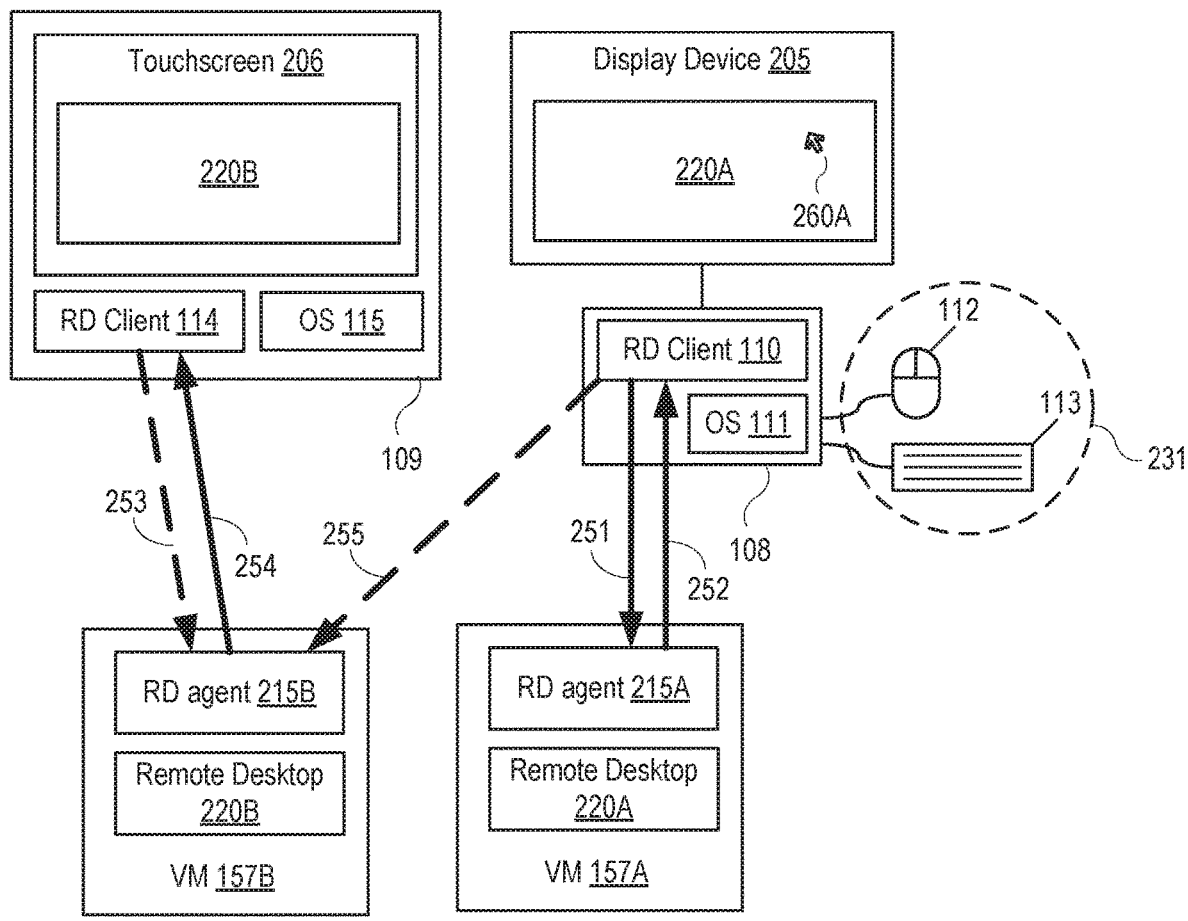

FIGS. 2A-2C are conceptual diagrams that illustrate communication paths between clients and agents of different remote desktops. In FIGS. 2A-2C, a remote desktop that is launched by client device 108 through RD client 110 is represented as remote desktop 220A hosted by virtual machine 157A, and a remote desktop that is launched by client device 109 through RD client 114 is represented as remote desktop 220B hosted by virtual machine 157B. When remote desktop 220A is launched, RD client 110 and RD agent 215A establish a communication channel 251 through which inputs made with mouse 112 and keyboard 113 are transmitted to RD agent 215A and a communication channel 252 through which an image of remote desktop 220A generated in virtual machine 157A is transmitted to client device 108, which displays the image of remote desktop 220A on a display device 205 of client device 108. When remote desktop 220B is launched, RD client 114 and RD agent 215B establish a communication channel 253 through which inputs made with touchscreen 206 of client device 109 are transmitted to RD agent 215B and a communication channel 254 through which an image of remote desktop 220B generated in virtual machine 157B is transmitted to client device 109, which displays the image of remote desktop 220B on touchscreen 206 of client device 109.

Referring to FIG. 2A, a user operation on an input device set 231, which includes mouse 112 and keyboard 113, generates mouse-and-keyboard events that RD client 110 transmits to RD agent 215A of remote desktop 220A through a communication channel 251. According to embodiments illustrated herein, RD client 110 and RD agent 215A establish communication channel 251 when the user selects input device set 231 as the shared input device in accordance with the method described below in conjunction with FIG. 3. In addition, the image of remote desktop 220A is updated in response to the mouse-and-keyboard events received through communication channel 251 and the updated image is transmitted through communication channel 252 from RD agent 215A to RD client 110.

When communication channel 251 is established, RD agent 215A generates an input pointer 260A within the image of remote desktop 220A, and the location of input pointer 260A is updated in accordance with user movements of mouse 112, which trigger mouse-and-keyboard events that are transmitted from RD client 110 to RD agent 215A through communication channel 251. When RD client 110 detects that input pointer 260A has moved across an edge of remote desktop 220A, RD client 110 transmits a screen move-off event to connection server 137, which handles the screen move-off event according to the method described below in conjunction with FIG. 4.

Referring to FIG. 2B, if connection server 137 detects that the screen move-off event is across a virtual boundary, which does not physically exist but is an imaginary or fictitious boundary, between remote desktop 220A and remote desktop 220B, connection server 137 instructs RD client 110 and RD agent 215B to establish a communication channel 255. In addition, connection server 137 instructs RD client 110 and RD agent 215A to discontinue using communication channel 251 and instructs RD client 114 and RD agent 215B to discontinue using communication channel 253. Upon establishment of communication channel 255, RD client 110 transmits all mouse-and-keyboard events generated in response to the user operation of input device set 231 to RD agent 215B through communication channel 255. Furthermore, RD agent 215A updates the image of remote desktop 220A to remove input pointer 260A and transmits the updated image to RD client 110 for display on display device 205, and RD agent 215B updates the image of remote desktop 220B, which now includes input pointer 260B, in response to the mouse-and-keyboard events received through communication channel 255, and the updated image is transmitted through communication channel 254 from RD agent 215B to RD client 114. When RD client 110 detects that input pointer 260B has moved across an edge of remote desktop 220B, RD client 110 transmits a screen move-off event to connection server 137, which handles the screen move-off event according to the method described below in conjunction with FIG. 4.

Referring to FIG. 2C, if connection server 137 detects that the screen move-off event is across the virtual boundary between remote desktop 220A and remote desktop 220B, connection server 137 instructs RD client 110 to transmit all mouse-and-keyboard events generated in response to the user operation of input device set 231 to RD agent 215A through communication channel 251. In addition, RD agent 215B updates the image of remote desktop 220B to remove input pointer 260B and transmits the updated image to RD client 114 for display on touchscreen 206, and RD agent 215A updates the image of remote desktop 220A, which now includes input pointer 260A, in response to the mouse-and-keyboard events received through communication channel 251, and the updated image is transmitted through communication channel 252 from RD agent 215A to RD client 110.

Figure 3:
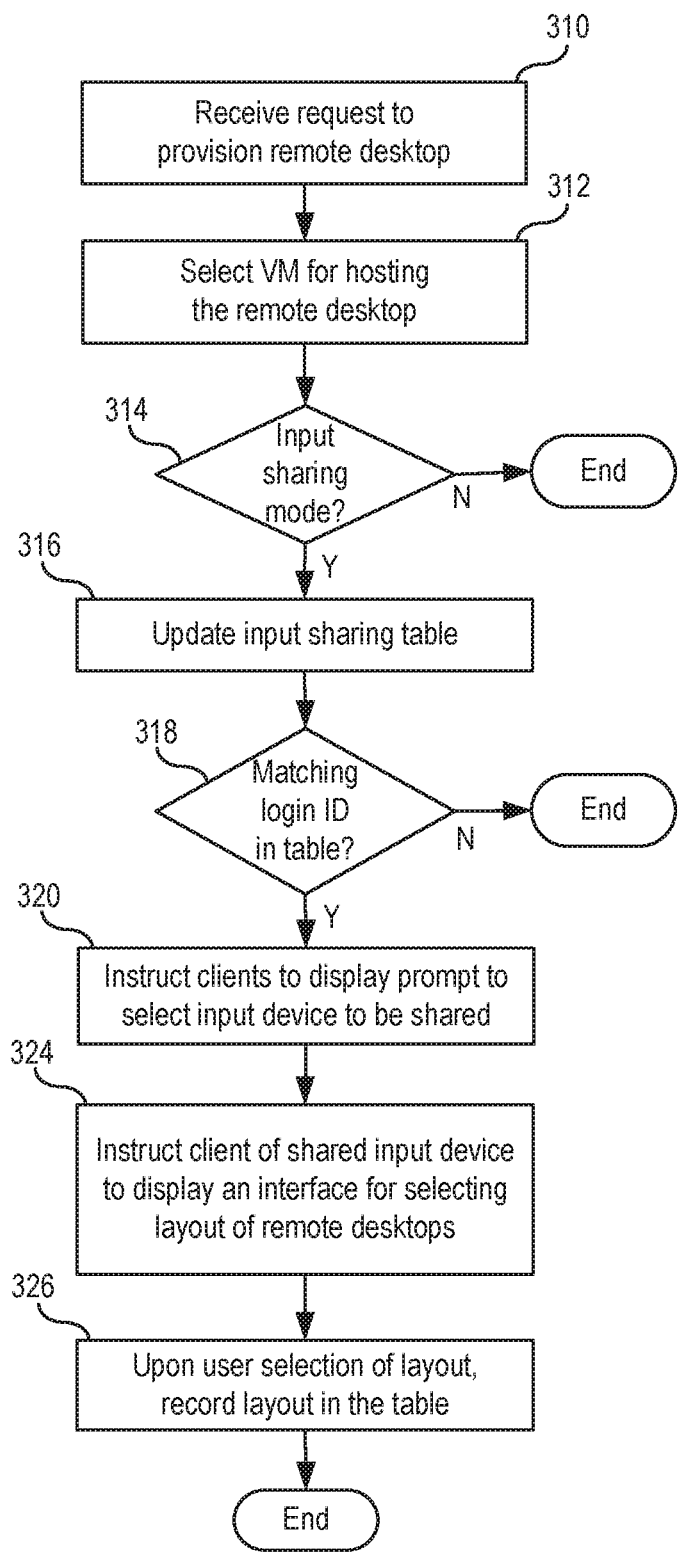
FIG. 3 is a flow diagram that illustrates steps of a method of enabling two remote desktops to share a single set of input devices.

FIG. 3 is a flow diagram that illustrates steps of a method of enabling two remote desktops to share a single set of input devices. In the examples illustrated herein, the method of FIG. 3 is carried out by connection server 137.

The method begins at step 310, when connection server 137 receives a request to provision a remote desktop from a client, e.g., RD client 110, which may indicate an input device sharing mode. Then, at step 312, connection server 137 selects a virtual machine for hosting the remote desktop and provisions the remote desktop in the virtual machine. As a result, two communication channels are established, one for transmitting mouse-and-keyboard events from the client to the remote desktop agent and another for transmitting remote desktop image updates from the remote desktop agent to the client.

At step 314, connection server 137 determines if the request indicates an input device sharing mode. If so, step 316 is executed next. If the request does not indicate an input device sharing mode, the method ends.

At step 316, connection server 137 updates a table that it is maintaining to track which remote desktops are provisioned with input device sharing, to add an entry corresponding to the remote desktop to be provisioned in response to the request. The fields of the table include login ID (which uniquely identifies the user who is making the request through the client), client ID (a unique identifier for the client), remote desktop ID (a unique identifier for the remote desktop), and a display size of the remote desktop.

After step 316, connection server 137 at step 318 searches the table for another entry (hereinafter referred to as "old") having the same login ID as the newly added entry (hereinafter referred to as "new"). If so, connection server 137 executes step 320. If not, the method ends.

At step 320, connection server 137 instructs both the old client and the new client to display a prompt for selecting the input devices thereof as the shared input device set. When a user selection is made in response to one of the two prompts (for ease of illustration hereafter, it is assumed that user selection is made in response to the prompt displayed by RD client 110 described above), connection server 137 at step 324 instructs RD client 110 to display an interface for selecting a layout of remote desktop 220A relative to remote desktop 22B (e.g., 220A above 220B, 220A below 220B, 220A to the left of 220B, or 220A to the right of 220B). At step 326, upon receiving a user selection of the layout, connection server 137 records the selected layout in the table and the method ends thereafter.

Figure 4:
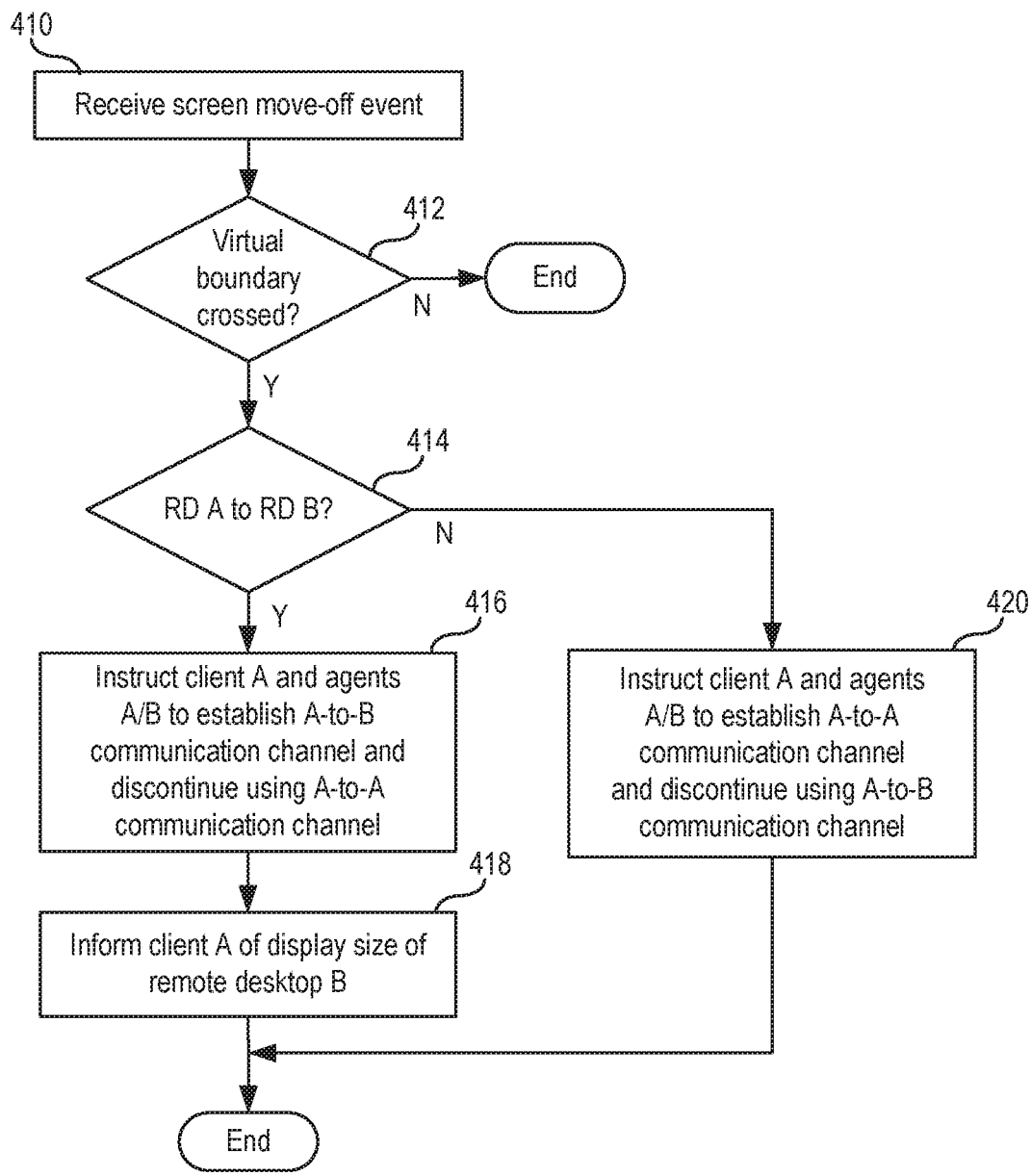
FIG. 4 is a flow diagram that illustrates steps of a method of switching a single set of input devices between remote desktops, according to one or more embodiments.

FIG. 4 is a flow diagram that illustrates steps of a method of switching a single set of input devices between remote desktops, according to one or more embodiments. In the example illustrated herein, the method of FIG. 4 is carried out by connection server 137.

The method of FIG. 4 begins at step 410 where connection server 137 receives a screen move-off event from RD client 110. In response, connection server 137 examines the selected layout recorded in the table for remote desktop 220A and remote desktop 220B and determines whether the screen move-off event has occurred at a virtual boundary between remote desktop 220A and remote desktop 220B. If the screen move-off event has occurred at the virtual boundary and is from RD A (remote desktop 220A) to RD B (remote desktop 220B) (step 412, Yes; step 414, Yes), step 416 is executed. If the screen move-off event has occurred at the virtual boundary and is from RD B to RD A (step 412, Yes; step 414, No), step 420 is executed. If the screen move-off event has not occurred at the virtual boundary (step 412, No), the method ends without disrupting the currently established communication channels.

At step 416, connection server 137 instructs RD client 110 and RD agent 215B to establish communication channel 255 (A-to-B communication channel) and instructs RD client 110 and RD agent 215A to discontinue using communication channel 251 (A-to-A communication channel). The resulting state of the communications channels is illustrated in FIG. 2B, where solid lines indicate established communication channels and dashed lines indicate discontinued communication channels. As a result, RD client 110 transmits all mouse-and-keyboard events generated in response to the user operation of input device set 231 to RD agent 215B through communication channel 255. In addition, RD agent 215A updates the image of remote desktop 220A to remove input pointer 260A and transmits the updated image to RD client 110 through communication channel 252 for display on display device 205, and RD agent 215B updates the image of remote desktop 220B, which now includes input pointer 260B, in response to the mouse-and-keyboard events received through communication channel 255, and the updated image is transmitted through communication channel 254 from RD agent 215B to RD client 114. At step 418, connection server 137 informs RD client 110 of the current display size of remote desktop 220B so that RD client 110 can detect a screen move-off event as the user is operating mouse 112. The method ends after step 418.

At step 420, connection server 137 instructs RD client 110 and RD agent 215A to establish communication channel 251 (A-to-A communication channel) and instructs RD client 110 and RD agent 215B to discontinue using communication channel 255 (A-to-B communication channel). The resulting state of the communications channels is illustrated in FIG. 2C, where solid lines indicate established communication channels and dashed lines indicate discontinued communication channels. As a result, RD client 110 transmits all mouse-and-keyboard events generated in response to the user operation of input device set 231 to RD agent 215A through communication channel 251. In addition, RD agent 215B updates the image of remote desktop 220B to remove input pointer 260B and transmits the updated image to RD client 114 through communication channel 254 for display on touchscreen 206, and RD agent 215A updates the image of remote desktop 220A, which now includes input pointer 260A, in response to the mouse-and-keyboard events received through communication channel 251, and the updated image is transmitted through communication channel 252 from RD agent 215A to RD client 110. The method ends after step 420.

The embodiments described above allow the use of a single set of mouse and keyboard to operate multiple remote desktops and to automatically switch the set of mouse and keyboard between remote desktops. The embodiments are especially useful when one or more of the multiple desktops are provisioned for a client device that has no mouse and keyboard.

Embodiments have been described above using the example of two client devices but the number of client devices may be two or more, and both client devices may employ a set of mouse and keyboard as input devices. In addition, remote desktops are illustrated as examples herein but embodiments are applicable to remote applications or to a combination of one or more remote desktops and one or more remote applications. Finally, embodiments are applied to sharing of input devices, but may also be applied to sharing of peripheral devices, such as camera, USB devices, local printer, local folder, etc.

As used herein, a "connection server" is any apparatus that is configured to manage connections to remote user sessions such as remote desktops and is also referred to as a "connection broker," and a "domain controller" is any apparatus that is configured to have access to and manage user log-in information.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of processing inputs made with an input device that is shared between a first remote desktop having a first display image, which is displayed on a first display of a first client device, and a second remote desktop having a second display image, which is displayed on a second display of a second client device, said method comprising:
    establishing a first communication channel between the first client device and a first remote computing device that is hosting the first remote desktop;
    establishing second and third communication channels between the second client device and a second remote computing device that is hosting the second remote desktop;
    sending events generated by the input device from the first client device to the first remote computing device through the first communication channel, and events generated by the second client device to the second remote computing device through the second communication channel;
    detecting movement of an input pointer of the input device currently displayed within the first display image on the first display across a virtual boundary between the first remote desktop and the second remote desktop;
    in response to detecting the movement of the input pointer:
        instructing the first client device and the first remote computing device to discontinue using the first communication channel;
        establishing a fourth communication channel between the first client device and a second remote computing device that is hosting the second remote desktop; and
        instructing the second client device and the second remote computing device to discontinue using the second communication channel;
    sending the events generated by the input device from the first client device to the second remote computing device through the fourth communication channel; and
    transmitting the second display image from the second remote computing device to the second client device through the third communication channel.

2. The method of claim 1, wherein
    in response to the instructions, the first remote computing device updates the first display image so that the input pointer is no longer displayed within the first display image and the second remote computing device updates the second display image so that the input pointer is displayed within the second display image.

3. The method of claim 2, wherein
    when the events are generated by the input device while the input pointer is displayed within the first display image, the first remote computing device updates the first display image based on the events and the second remote computing device does not update the second display image based on the events; and
    when the events are generated by the input device while the input pointer is displayed within the second display image, the second remote computing device updates the second display image based on the events and the first remote computing device does not update the first display image based on the events.

4. The method of claim 3, wherein the input device is an input device of the first client device.

5. The method of claim 3, wherein the input device is an input device of the second client device.

6. The method of claim 1, further comprising:
    maintaining a data structure that tracks, for each active remote desktop that has been launched in an input device sharing mode, a login ID and a client device ID.

7. The method of claim 6, further comprising:
    upon detecting that the first remote desktop has been launched in the input device sharing mode, updating the data structure to add an entry corresponding to the first remote desktop;
    upon detecting that the second remote desktop has been launched in the input device sharing mode, updating the data structure to add an entry corresponding to the second remote desktop; and
    upon detecting that both the first remote desktop and the second remote desktop have been launched in the input device sharing mode and are associated with the same login ID, prompting each of the first and second client devices to designate an input device thereof as the shared input device.

8. A non-transitory computer readable medium having instructions stored therein which are executable by a processor to carry out a method of processing inputs made with an input device that is shared between a first remote desktop having a first display image, which is displayed on a first display of a first client device, and a second remote desktop having a second display image, which is displayed on a second display of a second client device, said method comprising:
  establishing a first communication channel between the first client device and a first remote computing device that is hosting the first remote desktop;
  establishing second and third communication channels between the second client device and a second remote computing device that is hosting the second remote desktop;
  sending events generated by the input device from the first client device to the first remote computing device through the first communication channel, and events generated by the second client device to the second remote computing device through the second communication channel;
  detecting movement of an input pointer of the input device currently displayed within the first display image on the first display across a virtual boundary between the first remote desktop and the second remote desktop;
  in response to detecting the movement of the input pointer:
    instructing the first client device and the first remote computing device to discontinue using the first communication channel;
    establishing a fourth communication channel between the first client device and a second remote computing device that is hosting the second remote desktop; and
    instructing the second client device and the second remote computing device to discontinue using the second communication channel;
  sending the events generated by the input device from the first client device to the second remote computing device through the fourth communication channel; and
  transmitting the second display image from the second remote computing device to the second client device through the third communication channel.

9. The computer readable medium of claim 8, wherein in response to the instructions, the first remote computing device updates the first display image so that the input pointer is no longer displayed within the first display image and the second remote computing device updates the second display so that the input pointer is displayed within the second display image.

10. The computer readable medium of claim 9, wherein when the events are generated by the input device while the input pointer is displayed within the first display image, the first remote computing device updates the first display image based on the events and the second remote computing device does not update the second display image based on the events; and
when the events are generated by the input device while the input pointer is displayed within the second display image, the second remote computing device updates the second display image based on the events and the first remote computing device does not update the first display image based on the events.

11. The computer readable medium of claim 10, wherein the input device is an input device of the first client device.

12. The computer readable medium of claim 10, wherein the input device is an input device of the second client device.

13. The computer readable medium of claim 8, wherein the method further comprises:
  maintaining a data structure that tracks, for each active remote desktop that has been launched in an input device sharing mode, a login ID and a client device ID.

14. The computer readable medium of claim 13, wherein the method further comprises:
  upon detecting that the first remote desktop has been launched in the input device sharing mode, updating the data structure to add an entry corresponding to the first remote desktop;
  upon detecting that the second remote desktop has been launched in the input device sharing mode, updating the data structure to add an entry corresponding to the second remote desktop; and
  upon detecting that both the first remote desktop and the second remote desktop have been launched in the input device sharing mode and are associated with the same login ID, prompting each of the first and second client devices to designate an input device thereof as the shared input device.

15. A remote desktop computer system comprising:
  a first client device having a first remote desktop client running therein and a first input device;
  a second client device having a second remote desktop client running therein and a second input device;
  a first virtual machine having a first remote desktop agent running therein, wherein the first remote desktop agent is in communication with the first remote desktop client to provision a first remote desktop, the first remote desktop client configured to send events to the first remote desktop agent via a first communication channel;
  a second virtual machine having a second remote desktop agent running therein, wherein the second remote desktop agent is in communication with the second remote desktop client to provision a second remote desktop, the second remote desktop client configured to send events to the second remote desktop agent via a second communication channel, the second remote desktop agent and the second remote desktop client connected by a third communication channel; and
  a connection broker server that selected the first virtual machine to host the first remote desktop of the first client device and the second virtual machine to host the second remote desktop of the second client device, wherein the connection broker is configured to:
  detect movement of an input pointer of the first input device currently displayed within a first display image on a first display across a virtual boundary between the first remote desktop and the second remote desktop;
  in response to detecting the movement of the input pointer:
    instruct the first remote desktop client and the first remote desktop agent to discontinue using the first communication channel;
    establish a fourth communication channel between the first remote desktop client device and the second remote desktop agent; and
    instruct the second remote desktop client and the second remote desktop agent to discontinue using the second communication channel;
  send the events generated by the first input device from the first remote desktop client to the second remote desktop agent through the fourth communication channel; and
  transmit a second display image from the second remote desktop agent to the second remote desktop client through the third communication channel.

16. The system of claim 15, wherein the connection broker is further configured to:
   maintain a data structure that tracks, for each active remote desktop that has been launched in an input device sharing mode, a login ID and a client device ID.

17. The system of claim 16, wherein the connection broker is further configured to:
   upon detecting that the first remote desktop has been launched in the input device sharing mode, update the data structure to add an entry corresponding to the first remote desktop;
   upon detecting that the second remote desktop has been launched in the input device sharing mode, update the data structure to add an entry corresponding to the second remote desktop; and
   upon detecting that both the first remote desktop and the second remote desktop have been launched in the input device sharing mode and are associated with the same login ID, prompt each of the first and second client devices to designate an input device thereof as the shared input device.

* * * * *